3,813,431
p-[1-(NONYLTHIO)ETHYL]BENZENESULFONATES
Michael A. Lintner, Framingham, and Louis Long, Jr., Concord, Mass., assignors to the United States of America as represented by the Secretary of the Army
No Drawing. Filed May 21, 1969, Ser. No. 826,716
Int. Cl. C07c 143/24
U.S. Cl. 260—505 R         5 Claims

ABSTRACT OF THE DISCLOSURE

Novel p-[1-(nonylthio)ethyl]benzenesulfonates useful as surface active agents prepared by reacting p-(1-bromoethyl)benzenesulfonamide or ethyl p-(1-bromoethyl)-benzenesulfonate with sodium nonylmercaptide.

---

The invention described herein may be manufactured, used, and licensed by or for the Government for governmental purposes without the payment to us of any royalty thereon.

This invention relates to novel p-[1-(nonylthio)ethyl] benzenesulfonates and to novel processes for the synthesis of these compounds and to novel intermediates.

The novel compounds of this invention, having the formula:

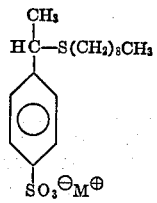

wherein M is a cation selected from the group consisting of alkali metals, alkaline earth metals, $NR_4$ where R is hydrogen or an alkyl group of 1 to 6 carbon atoms, and alkanolamines, are biodegradable surface active agents having excellent detersive properties exceeding those of linear alkyl sulfonates.

The preparation of similar types of compounds is disclosed in U.S. Pat. No. 3,344,173 issued Sept. 26, 1967 and in the currently pending U.S. patent application Ser. No. 587,383 of Trottier and Long, filed Oct. 31, 1964, now U. S. Pat. No. 3,505,395. In each instance, the desired thia-substituted alkylbenzenesulfonate is formed by reacting an n-alkylmercaptan with a parasubstituted haloalkylbenzenesulfonate. All attempts to form the compounds of this invention, p-[1-(nonylthio)ethyl]-benzenesulfonates, according to this procedure were unsuccessful in that the substitution would not take place. There is no suggestion in the literature why such a reaction would not proceed nor is there any suggestion of any other way to effect this reaction. Finally, it was discovered that by means of two hitherto unknown procedures the desired compounds could be obtained.

Both procedures, or syntheses, employed p-(1-bromoethyl) benzenesulfonyl chloride, obtained, by the bromination of ethylbenzene sulfonyl chloride. In one synthesis, p-(1-bromoethyl) benzenesulfonyl chloride is reacted with ammonia to form the corresponding sulfonamide which is reacted with n-nonylmercaptan to produce p - [1 - (nonylthio)ethyl]benzenesulfonamide which is hydrolyzed to the sulfonate. In the other synthesis, p-(1-bromoethyl)benzenesulfonyl chloride is reacted with sodium ethoxide to produce the ethyl ester of p-(1-bromoethyl)benzenesulfonate which can be reacted with n-nonylmercaptan and aqueous sodium hydroxide to produce the desired compound.

The preparation of these novel compounds and their novel syntheses will be described in the Examples that follow.

EXAMPLE 1

To a refluxing solution of 102.25 g. (0.5 mole) of p-ethylbenzenesulfonyl chloride, prepared by the method of Moralli appearing in the Bull. Soc. Chim. France, 20, 1044 (1953), in 400 ml. of carbon tetrachloride was added dropwise a solution of 80 g. (0.5 mole) of bromine in 400 ml. of carbon tetrachloride. The reaction mixture was stirred at reflux for a total of 4 hours, the solvent removed and product distilled, B.P. (1.75 mm.) 161–163, yield 124.67 g. (88.7%), $N_D^{23}$ 1.5821. The product solidified upon standing M.P. 38–40°. The infrared spectrum (neat film) showed absorptions at 3100 cm.$^{-1}$ (aromatic C—H stretching), 2995 and 2945 cm.$^{-1}$ (aliphatic C—H stretching), 1380 and 1180 cm.$^{-1}$ (due to —$SO_2Cl$) and 841 cm.$^{-}$ (para substitution). The NMR spectrum (neat) showed signals due to four aromatic protons at 7.72–8.17$\delta$ (quartet, J=8 c.p.s., the $A_2B_2$ system characteristic of para substitution in a phenyl ring), one benzal proton at 5.28–5.40$\delta$ (quartet, J=7 c.p.s.) and three methyl protons at 2.00–2.10$\delta$ (doublet, J=7 c.p.s.).

Analysis.—Calcd. for $C_8H_8BrClO_2S$ (283.5): C, 33.86; H, 2.82; Br, 28.22; Cl, 12.52; S, 11.29. Found: C, 33.83; H, 3.08; Br, 28.37; Cl, 12.48; S, 11.06.

Dry ammonia was passed into a stirred solution of 20 g. (70.6 mmoles) of p-(1-bromoethyl)benzenesulfonyl chloride in 250 ml. of acetone for 1 hour. The mixture was filtered to afford 3.56 g. of white solid ($NH_4Cl$) and a yellow solution. Removal of the solvent gave a yellow oil. Addition of 50 ml. of 5% aqueous hydrochloric acid gave a pale yellow solid which was collected by filtration and recrystallized twice from benzene to afford 14.25 g. (76.6%) of p-(1-bromoethyl)benzenesulfonamide, M.P. 126.5–127.8°. The infrared spectrum (KBr pellet) showed absorptions at 3380 and 3300 cm.$^{-1}$ ($NH_2N$—H stretching), 1335 and 1185 cm.$^{-1}$ (—$SO_2NH_2$) and 840 cm.$^{-1}$ (para substitution). The NMR spectrum (acetone, $d_6$) showed signals due to four aromatic protons at 7.62–8.03$\delta$ (quartet, J=8 c.p.s., $A_2B_2$ system), two protons of the amide $NH_2$ as a broad peak centered at 6.54$\delta$, one benzal proton at 5.27–5.62$\delta$ (quartet, J=6.5 c.p.s.) and three methyl protons at 1.96–2.07$\delta$ (quartet, J=6.5 c.p.s.).

Analysis.—Calc. for $C_8H_{10}BrNO_2S$ (264): C, 36.36; H, 3.79; Br, 30.30; N, 5.30; S, 12.12. Found: C, 36.52, 36.51; H, 3.79, 3.64; Br, 30.00, 30.23; N, 5.28, 5.24; S, 12.38, 12.41.

To a stirred solution of 3.46 g. (21.55 mmoles) of n-nonyl mercaptan and 862 mg. (21.55 mmoles) of sodium hydroxide in 50 ml. of absolute ethanol, heated to effect solution and formation of the mercaptide salt, was added, dropwise, a solution of 5.0 g. (21.55 mmoles) of p-(1-bromoethyl)benzenesulfonamide in 150 ml. of absolute ethanol. A cloudiness developed and, after the addition was complete, the reaction mixture was refluxed for 2 hr. The resulting clear solution was evaporated to give a yellow oily solid which was extracted with ether and filtered. The solid which remained was washed with water until washings showed a negative silver nitrate test and the remaining solid, 1.12 g., was set aside. The ether was evaporated from the filtrate to give 5.83 g. of pale yellow solid. The infrared spectra of the two solids were identical, total yield 6.95 g. (93.9%). The combined product was recrystallized twice from benzene to afford a white solid, M.P. 74–75°. The infrared spectrum ($CHCl_3$) showed absorptions at 3420 and 3300 cm.$^{-1}$ ($NH_2N$—H stretching), 2940 and 2875 cm.$^{-1}$ (aliphatic C—H stretching), 1160 and 1340 cm.$^{-1}$ (—$SO_2NH_2$) and 840 cm.$^{-1}$ (para substitution). The NMR spectrum ($CDCl_3$) showed signals due to four aromatic protons in an $A_2B_2$ system at 7.37–8.07$\delta$ (quartet, J=8 c.p.s.), two protons of the amide $NH_2$ as a broad peak centered at 5.50$\delta$, one benzal proton at 3.80–4.23$\delta$ (quartet, J=7 c.p.s.), two methylene protons, assigned to the methylene group adjacent to the sulfur atom, a 2.17–2.50$\delta$ (triplet, J=7 c.p.s.) and twenty protons, assigned to the remainder of the nonyl group and the methyl attached to the benzal carbon, as a complex multiplet from 0.68–1.82$\delta$.

*Anal.*—Calc. for $C_7H_{29}NO_2S_2$ (343.6): C, 59.43; H, 8.51; N, 4.08; S, 18.67. Found: C, 59.42, 59.55; H, 8.63, 8.71; N, 410, 4.11; S, 18.69, 18.70.

A mixture of 2 g. (5.82 mmoles) of p-[1-(nonylthio) ethyl]benzenesulfonamide and 15 ml. of 80% sulfuric acid (prepared by carefully mixing 3 parts of concentrated sulfuric acid with one part of water) was stirred at 165° for 30 min. The mixture was poured into 100 ml. of water and made basic by the addition of 4 N sodium hydroxide solution. The resulting solution was evaporated to leave a dark solid which was placed in a Soxhlet extraction apparatus and extracted with ethanol. The ethanol was removed from the extraction solution to give a tan solid which was taken up in water and dilute hydrochloric acid was added to a pH of ca 8. The water was removed to give a pale tan solid which was crystallized from benzene to give 1.24 g. (57.7%) of a colorless solid whose infrared spectrum was identical with that of authentic sodium p-[1-(nonylthio) ethyl]benzenesulfonate.

EXAMPLE 2

To a stirred solution of 28.35 g. (0.1 mole) of p-(1-bromoethyl)benzenesulfonyl chloride in 100 ml. of absolute ethanol, maintained at a temperature below 20°, was added, dropwise, a solution of 0.1 mole of sodium ethoxide (from 2.3 g. (0.1 g.-atom) of sodium) in 100 ml. of absolute ethanol. The solution turned milk white and the temperature was maintained near 20° throughout the addition. The addition required 10 min. and was allowed to stir for an additional 45 min., at which time a test for the presence of base, using phenolphthalein as indicator, was negative. The reaction mixture was poured into 400 ml. of water, extracted with 200 ml. of chloroform and then with 2–100 ml. portions of chloroform. The combined organic extracts were washed with 50 ml. of water, 150 ml. of aqueous sodium bicarbonate, 2–60 ml. portions of water, dried over sodium sulfate, filtered and solvent removed to give 29.01 g. (99.9% yield) of colorless liquid which decomposed when an attempt was made to distil it at 1.0 mm. The infrared spectrum (neat) showed absorptions at 2980 and 2910 cm.$^{-1}$ (aliphatic C—H stretching), 1180 and 1360 cm.$^{-1}$ (—$SO_2$—OR) and 844 cm.$^{-1}$ (para substitution). The NMR spectrum (neat) showed signals due to four aromatic protons in an $A_2B_2$ pattern at 7.52–7.92$\delta$ (quartet, J=8 c.p.s.), one one benzal proton at 3.78–4.21$\delta$ (Quartet, J=7 c.p.c.), methylene protons of the ethyl group at 3.82–4.17$\delta$ (quartet, J=7 c.p.s.), three protons of the methyl group attached to the benzal carbon at 1.78–1.90$\delta$ (doublet, J=7 c.p.s.) and three methyl protons of the ethyl group at 0.95–1.18$\delta$ (triplet, J=7 c.p.s.). The product was used without further purification.

To a stirred solution of 21.3 g. (0.1331 mole) of n-nonyl mercaptan and 10.648 g. (0.2662 mole) of so-dium hydroxide in 50 ml. of absoute ethanol at 5° (previously heated to 90° to effect solution and formation of the mercaptide) was added, dropwise, 39 g. (0.1331 mole) of ethyl p-(1-bromoethyl)benzenesulfonate. A white precipitate formed and the temperature was maintained below 8° throughout the addition. The mixture was slowly allowed to warm to room temperature and filtered to give a white solid. Evaporation of the filtrate gave a pale yellow solid which was extracted with ether to remove any unreacted starting material. Infrared spectra of the original solid collected from the precipitate and the residue after the ether extraction were practically identical. The combined product was recrystallized twice from 95% ethanol to give 18.91 g. of sodium p-[1-(nonylthio)ethyl]benzenesulfonate (38.8%). The infrared spectrum of the product exhibited absorptions at 2900 and 2980 cm.$^{-1}$ (aliphatic C—H stretching), 1380 and 1470 cm.$^{-1}$ (C—H deformation), 1059 and 1140 cm.$^{-1}$ (—$SO_3^-$ $NA^+$), 640 cm.$^{-1}$ (sulfur attached to a primary carbon) and 615 cm.$^{-1}$ (sulfur attached to a secondary carbon). The NMR spectrum (deuterated water with external TMS) showed signals due to 4 aromatic protons, in an $A_2B_2$ pattern, at 7.07–7.78$\delta$ (quartet, J=8 c.p.s.), one benzal proton at 3.78–4.2$\delta$ (quartet, J=7 c.p.s.), two methylene protons, assigned to the methylene group adjacent to the sulfur atom, at 2.18–2.51$\delta$ (triplet, J=7 c.p.s.) and twenty protons, assigned to the remainder of the nonyl group and the methyl attached to the benzal carbon, as a compex multiplet from 0.65–1.83$\delta$.

*Anal.*—Calc. for $C_{17}H_{27}NaO_3S_2$ (366): C, 55.71; H, 7.43; S, 17.50. Found: C, 55.44, 55.59; H, 7.27, 7.54; S, 17.69, 17.78.

The nuclear magnetic resonance spectra were recorded on a Varian 60 mHz. spectrometer at 60° C. External TMS was provided as a reference for those spectra determined in deuterated water and internal TMS for those in other solvents ($\delta$=10.00 for methylsilyl protons). The infrared spectra were recorded on a Perken-Elmer 137 infracord. Temperature measurements, boiling and melting points are uncorrected.

The purified sodium p-[1-(nonylthio)ethyl]benzenesulfonate was submitted for testing to determine biodegradability, solubility, surface tension, wetting and detergency. The results are shown in Table 1 and a comparison with a compounded linear alkyl sulfonate is given.

TABLE 1

| Properties | Sodium p-[1-nonylthio)-ethyl]benzenesulfonate | Linear alkyl sulfonate (90% active) |
|---|---|---|
| Biodegradability [a] | 2 days/100% | 3 days/100%. |
| Solubility (g./100 cc. $H_2O$), 25° | Ca. 2 | >33. |
| Surface tension (25°, dyne cm.$^{-1}$ | | |
| 1. 0.01% in dist. $H_2O$ | 59.2 | 51.2. |
| 2. 0.05% in dist. $H_2O$ | 48.6 | 39.1. |
| Draves wetting test at 25° (sinking seconds) 0.1% in $H_2O$ | 16 | 8. |
| Detergency tests at 60° in $H_2O$: | | |
| 1. Soil removal | 36.4% | 34.0% |
| 2. Whiteness retention | 88.7% | 87.1%. |

[a] Shake flask method, R. C. Alfred, E. A. Setzkorn and J. R. L. Huddleston, J. Am. Oil. Chem. Soc., 41, 13 (1964).

We claim:
1. A compound of the formula:

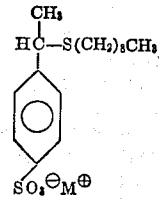

wherein M is a cation selected from the group consisting of alkali metals, alkaline earth metals, $NH_4$ and alkanolamines, where R is hydrogen or an alkyl group of 1–6 carbon atoms.

2. A compound according to claim 1 wherein M is sodium.

3. The process of preparing the compound of claim 2 which comprises reacting p-(1-bromoethyl)benzenesulfonamide with an equivalent amount of sodium nonylmercaptide to form p-[1-(nonythio)ethyl]benzenesulfonamide and hydrolyzing the latter to form sodium p-[1-(nonylthio)ethyl]benzensulfonate.

4. The process according to claim 3 wherein the reaction is carried out in the presence of an alcohol.

5. The process according to claim 3 wherein p-(1-bromoethyl)benzenesulfonamide is formed by reacting p-(1-bromoethyl)benzenesulfonyl chloride with ammonia.

References Cited
UNITED STATES PATENTS 3,344,173  9/1967  Lang et al. _____ 260—505

LEON ZITVER, Primary Examiner

A. SIEGEL, Assistant Examiner

U.S. Cl. X.R.

252—353, 558; 260—501.19, 501.21